(12) United States Patent
Sugauchi et al.

(10) Patent No.: US 10,723,061 B2
(45) Date of Patent: Jul. 28, 2020

(54) METHOD FOR MANUFACTURING HOLLOW MOLDED ARTICLE AND APPARATUS FOR MOLDING HOLLOW MOLDED ARTICLE

(71) Applicant: MORIROKU TECHNOLOGY COMPANY, LTD., Tokyo (JP)

(72) Inventors: Yasufumi Sugauchi, Tokyo (JP); Jungo Horiyama, Tokyo (JP); Hidetoshi Morohashi, Tokyo (JP)

(73) Assignee: MORIROKU TECHNOLOGY COMPANY, LTD., Tokyo (JP)

( * ) Notice: Subject to any disclaimer, the term of this patent is extended or adjusted under 35 U.S.C. 154(b) by 0 days.

(21) Appl. No.: 16/454,912

(22) Filed: Jun. 27, 2019

(65) Prior Publication Data

US 2019/0315044 A1 Oct. 17, 2019

Related U.S. Application Data

(62) Division of application No. 15/084,958, filed on Mar. 30, 2016, now Pat. No. 10,369,741.

(30) Foreign Application Priority Data

Mar. 31, 2015 (JP) .................................. 2015-074611

(51) Int. Cl.
*B29C 51/10* (2006.01)
*B29K 101/12* (2006.01)
*B29L 22/00* (2006.01)

(52) U.S. Cl.
CPC .......... *B29C 51/10* (2013.01); *B29K 2101/12* (2013.01); *B29L 2022/00* (2013.01)

(58) Field of Classification Search
CPC ..... B29C 51/10; B29C 51/267; B29C 51/006; B29C 49/0047; B29C 49/0031;
(Continued)

(56) References Cited

U.S. PATENT DOCUMENTS 3,982,877 A 9/1976 Wyeth et al.

FOREIGN PATENT DOCUMENTS

JP H0880562 A 3/1996
JP H1170573 A 3/1999
(Continued)

OTHER PUBLICATIONS

Japanese Office Action dated Sep. 26, 2017 for Application No. 2015074611.

*Primary Examiner* — Xiao S Zhao
*Assistant Examiner* — Ninh V Le
(74) *Attorney, Agent, or Firm* — Moser Taboada

(57) ABSTRACT

While naturally suctioning air between a first thermoplastic resin sheet and a second thermoplastic resin sheet from a fluid passage formed in a first thermoplastic resin sheet, the first thermoplastic resin sheet is subjected to vacuum-molding by a first vacuum molding die, a first shaping section is formed in the first thermoplastic resin sheet by a molded section of the first vacuum molding die, the second thermoplastic resin sheet is subjected to vacuum-molding by a second vacuum molding die, a second shaping section is formed in the second thermoplastic resin sheet by the molded section of the second vacuum molding die, and a hollow section is defined between the first thermoplastic resin sheet and the second thermoplastic resin sheet by the first shaping section and the second shaping section.

8 Claims, 15 Drawing Sheets

(58) Field of Classification Search
CPC ... B29C 49/06; B29C 49/60; B29C 2791/006; B29C 2049/0057; B29C 2049/0063; B29L 2022/00; B29K 2101/12; B32B 3/30; B32B 37/10
See application file for complete search history.

(56) References Cited

FOREIGN PATENT DOCUMENTS

| | | |
|---|---|---|
| JP | 2005119042 A | 5/2000 |
| JP | 2010083144 A | 4/2010 |

METHOD FOR MANUFACTURING HOLLOW MOLDED ARTICLE AND APPARATUS FOR MOLDING HOLLOW MOLDED ARTICLE

CROSS-REFERENCE TO RELATED APPLICATIONS

This application is a divisional of U.S. application Ser. No. 15/084,958, filed on Mar. 30, 2016, which claims the benefit of Japanese Patent Application No. 2015-074611 filed on Mar. 31, 2015, and the contents of each of which are incorporated herein by reference.

BACKGROUND

Field of the Invention

The present invention relates to a method for manufacturing a hollow molded article by performing vacuum molding of two thermoplastic resin sheets and an apparatus for molding a hollow molded article.

Description of the Related Art

Japanese Patent Application, Publication No. 2010-83144 discloses a method for manufacturing a hollow body made up of at least two thermoplastic resin sheets, using a metal mold having a pair of metal mold members freely movable in a predetermined direction. The metal mold members have a molding surface capable of suctioning air, and an outer circumferential section (a flange) that surrounds the molding surface. Further, the use of a foamed sheet as the thermoplastic resin sheet is disclosed.

The above-described conventional manufacturing method has a supplying process of supplying the laminated thermoplastic resin sheets between the metal mold members, a heating process of heating the thermoplastic resin sheets; a mold clamping process of relatively bringing the metal mold members closer to each other and integrally pressing the respective heated thermoplastic resin sheets between the outer edge sections of the metal mold members to integrate each sheet in a section pressed at the outer edge sections; and a shaping process of feeding air into a space formed between the thermoplastic resin sheets, while suctioning air out from the molding surface, causing the respective thermoplastic resin sheets facing the mold surface to follow the molding surface, and shaping the thermoplastic resin sheets into a predetermined shape.

In the above-described shaping process, a method for interposing a tube 2 between a sheet 1 and a sheet 1 and introducing the external air through the tube is described as a method for feeding air into the space formed between the thermoplastic resin sheets, in paragraph 0021, with reference to FIG. 3, at the time of the above-described supplying process. Further, the same paragraph discloses that the temperature of the air fed from the tube 32 is preferably 60 to 200° C. in order to improve moldability, and a compressor or the like is connected to one end of the tube 32 to feed the air. Further, paragraph 0022 discloses a decompressing process of reducing the pressure of a space 31 formed between the sheets 1 by connecting a pump to one end of the tube. Further, paragraph number 0023 discloses that a process of feeding the air into the space 31 again after the completion of the decompressing process may be further included.

However, in the above-described conventional manufacturing method, in the supplying process, a tube for feeding air into the space formed between the sheets is required to be interposed between the sheet and the sheet. Therefore, there is a need for a device for inserting and holding the tube, however, a generally used vacuum molding machine does not have a device for operating the tube. Therefore, a dedicated device for operating the tube is required to perform the above-described conventional manufacturing method.

An object of an aspect of the present invention is to provide a method for manufacturing a hollow molded article that is capable of stably manufacturing the hollow molded article, without causing a hollow structure evacuation, and is capable of manufacturing the hollow molded article, using a general-purpose vacuum molding machine, without separately requiring a facility and device for feeding air between the two sheets.

Another object of an aspect of the present invention is to provide a method for manufacturing a hollow molded article that is capable of manufacturing the hollow molded article with a simple structure, by configuring so that air is naturally suctioned into between the two thermoplastic resin sheets, accompanying the progress of vacuum molding of the thermoplastic resin sheet.

SUMMARY

According to an aspect of the present invention, a method for manufacturing a hollow molded article includes: a process of forming a fluid passage having openings on a front surface and a rear surface of a first thermoplastic resin sheet to be vacuum-molded by a first vacuum molding die; a process of heating and softening a second thermoplastic resin sheet to be vacuum-molded by a second vacuum molding die and the first thermoplastic resin sheet; a process of holding (nipping, pressing, compressing) both the sheets by the first and second vacuum molding dies, in a state where the first and second vacuum molding dies are clamped and the first and second thermoplastic resin sheets are superimposed, sealing the molding surface of the first vacuum molding die by the first the thermoplastic resin sheet, sealing the molding surface of the second vacuum molding die by the second thermoplastic resin sheet, joining the first and second heat thermoplastic resin sheets around the molding surfaces of the first and second vacuum molding dies, and connecting the opening on the first vacuum molding die side among the openings of the fluid passage to a fluid supply source; a process of performing vacuum-molding of the first thermoplastic resin sheet by the first vacuum molding die, forming a first shaping section in the first thermoplastic resin sheet by a molded section of the first vacuum molding die, performing vacuum-molding of the second thermoplastic resin sheet by the second vacuum molding die, forming a second shaping section in the second thermoplastic resin sheet by a molded section of the second vacuum molding die, and defining a hollow section between the first thermoplastic resin sheet and the second thermoplastic resin sheet by the first shaping section and the second shaping section; and a process of opening the first and second vacuum molding dies to take out the molded article.

In the method for manufacturing a hollow molded article of this configuration, a fluid passage having an opening on each of the front surface and the rear surface of the sheet is previously formed on one sheet of the two thermoplastic resin sheets (hereinafter, simply referred to as a "sheet" or a "thermoplastic sheet") to be vacuum-molded. Further, when clamping the vacuum molding die, one opening is connected to a fluid supply source, and the other opening is disposed on the side of the other sheet. Accordingly, at the time of vacuum molding of the sheets, a fluid such as air flows between the two sheets through the fluid passages formed on one sheet. And, the two sheets can be vacuum-molded into a desired shape. That is, in the method for manufacturing the hollow molded article of the aspect of the present invention, since the facility and device for feeding the air between the two sheets are not separately required, it is possible to manufacture a hollow molded article using a general-purpose vacuum molding machine.

Further, the method for manufacturing the hollow molded article of an aspect of the present invention may be configured so that, when both sheets are held by the first and second vacuum molding dies, in a state where the first and second vacuum molding dies are clamped and the first and second thermoplastic resin sheets are superimposed, a region of the first thermoplastic resin sheet extending between the molding surface of the first vacuum molding die and the fluid passage of the first thermoplastic resin sheet is, together with the second thermoplastic resin sheet, pressed into a concave section of the second vacuum molding die by a convex section provided on the first vacuum molding die, and a seal section extending along the convex section of the first vacuum molding die is formed between the first vacuum molding die and the first thermoplastic resin sheet.

At this time, the convex section of the first vacuum molding die may be configured to have a height at least equivalent to an amount of pushing the first thermoplastic resin sheet and the second thermoplastic resin sheet into the concave section, when the first and second vacuum molding dies are clamped.

Moreover, the concave section of the second vacuum molding die may be formed by a part of the molding surface of the second vacuum molding die.

In the method for manufacturing a hollow molded article of an aspect of the present invention, the fluid passage is formed in one of the two thermoplastic resin sheets. For example, when forming the fluid passage in the first thermoplastic resin sheet, in a state where the first and second vacuum molding dies are clamped and the first and second thermoplastic resin sheets are superimposed, both sheets are held by the first and second vacuum molding dies. At that time, when the molding surface of the first vacuum molding die and the fluid passage of the first thermoplastic resin sheet are in close proximity, there is a possibility of incompletion of the sealing state of the molding surface of the first vacuum molding die. Therefore, in such a case, in order to reliably seal the molding surface of the first vacuum molding die with the first thermoplastic resin sheet, the region of the first thermoplastic resin sheet, extending between the molding surface of the first vacuum molding die and the fluid passage of the first thermoplastic sheet is, together with the second thermoplastic resin sheet, pressed into the concave section of the second vacuum molding die by the convex section of the first vacuum molding die. Thus, it is possible to provide a configuration such that a seal section extending along the convex section of the first vacuum molding die is formed between the first vacuum molding die and the first thermoplastic resin sheet. The seal section extends between the molding surface of the first vacuum molding die and the fluid passage of the first thermoplastic sheet to seal the molding surface of the first vacuum molding die from the fluid passage of the first thermoplastic resin sheet. Therefore, even when the molding surface of the first vacuum molding die and the fluid passage of the first thermoplastic resin sheet are in close proximity, it is possible to properly perform the vacuum molding of the first thermoplastic resin sheet.

The height of the convex section of the first vacuum molding die is preferably set to have a height enough to at least push the first thermoplastic resin sheet and the second thermoplastic resin sheet into the concave section of the second vacuum molding die when clamping the dies. The reason is that the first thermoplastic resin sheet bent along the convex section can be held to the convex section by the second thermoplastic resin sheet bent along the convex section. Further, the width of the convex section is preferably set so that a clearance in the widthwise direction between the convex section and the concave section is equal to or less than the thicknesses of the superimposed first and second thermoplastic resin sheets, when entering the concave section of the second vacuum molding die. This setting is to obtain good sealing performance. Furthermore, the clearance between the convex section and the bottom section of the concave section when the convex section enters into the concave section of the second vacuum molding die may be a distance equal to or more than the thickness of the superimposed first and second thermoplastic resin sheets. This is in order to form a clearance for the passage of fluid between the first thermoplastic resin sheet and the second thermoplastic resin sheet, when the second thermoplastic resin sheet is vacuum-molded.

When increasing the height of the convex section of the first vacuum molding die to increase the depth at which the first thermoplastic resin sheet and the second thermoplastic resin sheet are pushed into the concave section of the second vacuum molding die, a force of holding the first thermoplastic resin sheet bent along the convex section to the convex section by the second thermoplastic resin sheet bent along the convex section increases. Furthermore, it is also possible to increase an area of an overlapping section between both side surfaces of the convex section and the concave section. Therefore, it is also possible to increase the area of the first and second thermoplastic resin sheets held between both side surfaces of the convex section and the concave section. Thus it is possible to further increase the sealing force of the above-described seal section.

Further, when forming the concave section of the second vacuum molding die by a part of the molding surface of the second vacuum molding die, machining of the concave section for being engaged with the convex section of the first vacuum molding die is not required in the second vacuum molding die. The reason is that the molding surface is already formed on the second vacuum molding die. When the width of the convex section of the first vacuum molding die is larger than the width of the molding surface of the second vacuum molding die, the concave section of a dimension capable of being engaged with the convex section of the first vacuum molding die is required to be machined in the second molding die. Further, when the fluid passage of the first thermoplastic resin sheet is formed at a position deviated from the molding surface of the first vacuum molding die, rather than being formed at a position aligned with the molding surface of the first vacuum molding die, if necessary, the molding surface of the second the vacuum molding die extends to the position of the fluid passage of the first thermoplastic resin sheet. At this time, the second thermoplastic resin sheet is spaced apart from the first thermoplastic resin sheet, such that a fluid such as air can smoothly flow into between the first and second thermoplastic resin sheets from the fluid passage of the first thermoplastic resin sheet.

Further, in the method for manufacturing a hollow molded article of an aspect of the present invention, it is possible to provide a configuration so that air is suctioned from the fluid supply source through the fluid passage into between the first thermoplastic resin sheet and the second heat thermoplastic resin sheet, accompanying the progress of molding of the first shaping section and the second shaping section. The fluid supply source of this case is surrounding atmosphere of the vacuum molding machine. At this time, air is naturally suctioned in with the deformation of the first and second thermoplastic resin sheets. Accordingly, it is possible to provide a method for manufacturing a hollow molded article capable of manufacturing the hollow molded article with a simple structure.

In the method for manufacturing a hollow molded article of an aspect of the present invention, it is possible to simultaneously start the vacuum molding of the first thermoplastic resin sheet using the first vacuum molding die and the vacuum molding of the second thermoplastic resin sheet using the second vacuum molding die. Thus, it is possible to shorten the manufacturing time of the hollow molded article.

Further, in the method for manufacturing a hollow molded article of an aspect of the present invention, it is possible to start the vacuum molding of the first thermoplastic resin sheet using the first vacuum molding die and the vacuum molding of the second thermoplastic resin sheet using the second vacuum molding die with time difference.

For example, depending on the shape of the molding surface of the vacuum molding die, in some cases, the molding of one of the thermoplastic resin sheet may be performed earlier than the molding of the other thermoplastic resin sheet.

In the method for manufacturing a hollow molded article of an aspect of the present invention, the first vacuum molding die and the second vacuum molding die may be formed using a general-purpose straight molding female die.

In the method for manufacturing a hollow molded article of an aspect of the present invention, it is possible to use a foamed sheet in the first and second thermoplastic resin sheets. When suitably selecting the thickness, the expansion ratio or the like of the foamed sheet of the foamed layer, sagging (drawdown) of the sheet when heating the sheet can be limited.

In the manufacturing method of an aspect of the present invention, it is possible to manufacture a cylindrical hollow body. Thus, for example, it is possible to manufacture an air-conditioning duct of a vehicle such as a motor vehicle.

According to aspect of the present invention, a molding apparatus of a hollow molded article, of which a hollow section is molded between a pair of softened and heated thermoplastic resin sheets superimposed, by a pair of vacuum molding dies having a shaping section to form concave sections facing each other on the pair of thermoplastic resin sheets and an air bleeding hole provided in the shaping section, wherein one of the pair of thermoplastic resin sheets is formed with a through-hole to which the hollow section is connected, one vacuum molding die corresponding to the one of thermoplastic resin sheet is formed with a notch corresponding to the through-hole, when holding the pair of thermoplastic resin sheets by closing the pair of vacuum molding dies in a state in which one thermoplastic resin sheet and the other thermoplastic resin sheet are superimposed with each other and are disposed between the pair of vacuum molding dies, and a seal section for sealing between the shaping section and the notch is formed between the shaping section of the one vacuum molding die and the notch.

Further, in the apparatus for molding the hollow molded article, the seal section may be configured by a convex section formed on the one vacuum molding die, and a concave shape corresponding to the convex section formed in the other vacuum molding die.

Further, in the apparatus for molding the hollow molded article, the convex section forms a substantially trapezoidal shape, a space is provided between a front end section of the convex section and the concave section is provided, and by holding the pair of thermoplastic resin sheets between the concave shape and a side surface section of the convex section facing the concave shape, the seal section can be formed.

According to another aspect of the present invention, an apparatus for molding a hollow molded article, the apparatus includes: a first molding die; and a second molding die disposed to face the first molding die, wherein a pressing surface for partially holding a pair of resin sheets between the first molding die and the second molding die, a molding surface for forming a concave section with respect to the pressing surface, and a plurality of suction holes provided on the molding surface are provided, the first molding die includes a convex section provided to partially project in comparison with the pressing surface of the first molding die, and further includes a fluid supply source adjacent to the convex section, when holding the pair of thermoplastic resin sheets by closing the pair of molding dies in a state in which the pair of resin sheets are superimposed with each other and are disposed between the pair of molding dies.

Further, in the apparatus for molding the hollow molded article, the fluid supply source is configured to be connected to a through-hole provided on one resin sheet corresponding to the first molding die out of the pair of resin sheet.

Further, in the apparatus for molding the hollow molded article, the fluid supply source is configured to form a notch recessed partially in the first molding die.

Further, in the apparatus for molding the hollow molded article, the convex section forms a substantially trapezoidal shape, a space is provided between a front end section of the convex section and the concave section is provided, and by holding the pair of thermoplastic resin sheets between the concave shape and a side surface section of the convex section facing the concave shape, the seal section can be formed.

According to another aspect of the present invention a method for manufacturing a hollow molded article includes: a process of superimposing a first resin sheet having a through-hole and a second resin sheet; a process of disposing the first resin sheet and the second resin sheet between a first molding die and a second molding die to partially join the first resin sheet and the second resin sheet; and a process of performing vacuum molding of each of the first resin sheet and the second resin sheet by the first molding die and the second molding die, and supplying gas to a space formed between the first resin sheet and the second resin sheet via the through-hole of the first resin sheet.

According to another aspect of the present invention, a method for manufacturing a hollow molded article includes a first molding die and a second molding die disposed to face the first molding die, wherein each the first molding die and the second molding die has a pressing surface for partially holding two resin sheets between the first molding die and the second molding die, a molding surface for forming a concave section with respect to the pressing surface, and a plurality of suction holes provided on the molding surface, and the first molding die further includes a convex section provided to partially project as compared to the pressing surface of the first molding die.

In the above method for manufacturing a hollow molded article, a notch corresponding to a through-hole may be provided on one resin sheet corresponding to the first molding die out of the two resin sheet.

According to the method for manufacturing the hollow molded article of the aspect of the present invention, a fluid such as air is naturally suctioned into the space between the two thermoplastic resin sheets from the fluid passage simultaneously with the vacuum suction of the thermoplastic resin sheet, thereby making it possible to prevent evacuation of the hollow structure. Therefore, it is possible to stably manufacture a hollow molded article. Further, since facilities and devices for feeding air into between the two sheets are not separately required, it is possible to manufacture a hollow molded article using the general-purpose vacuum molding machine.

Further, by forming a seal section extending between the molding surface of the first vacuum molding die and the fluid passage of the first thermoplastic sheet, the molding surface of the first vacuum molding die is sealed from the fluid passage of the first thermoplastic resin sheet. Accordingly, in the fluid passage of the first thermoplastic resin sheet and its periphery, mating of the metal mold due to the first and second vacuum molding dies does not exist. Further, even when the molding surface of the first vacuum molding and the fluid passage of the first thermoplastic resin sheet are in close proximity, it is possible to prevent the sheet shaping failure of the metal mold cavity.

Further, by forming a concave section of the second vacuum molding die using a part of the molding surface of the second vacuum molding die, the concave section for being engaged with the convex section of the first vacuum molding die is not required to be machined in the second vacuum molding die.

By a configuration in which air is naturally suctioned into between the first thermoplastic resin sheet and the second thermoplastic resin sheet from a fluid supply source through the fluid passage, accompanying the progress of molding of the first shaping section and the second shaping section, it is possible to provide the manufacturing method of a simpler configuration.

Furthermore, the vacuum molding of the first thermoplastic resin sheet using the first vacuum molding die and the vacuum molding of the second thermoplastic resin sheet using the second vacuum molding mold can be started at the same time and can be started with time difference. As a result, it is possible to contribute to the shortening of the manufacturing time of the hollow molded article and the implementation of the appropriate vacuum molding.

Further, when the first vacuum molding die and the second vacuum molding die are formed using a widely used straight molding female die and a foamed sheet is used in the first and second thermoplastic resin sheets, it is possible to inexpensively provide a high-quality hollow molded article. For example, it is possible to inexpensively manufacture an air-conditioning duct of a vehicle such as a motor vehicle having a desired dimensional accuracy.

The above-described features of the aspects of the present invention and other features of the aspects of the present invention will become clear, by the following description provided with reference to the drawings.

DETAILED DESCRIPTION

Hereinafter, a method for manufacturing a hollow molded article by performing the vacuum molding on two thermoplastic resin sheets will be described. A case of manufacturing a tubular hollow molded article will be described in the first embodiment, and a case of manufacturing an air-conditioning duct of a motor vehicle will be described in the second embodiment. The air-conditioning duct is connected to an air-conditioning device that is installed in an instrument panel of a motor vehicle, a rear part of a console located between the driver's sheet and the passenger sheet, a roof or the like. The vacuum molding die of any embodiments basically forms a straight molding female die. Further, the thermoplastic resin sheet is a foamed sheet. An electronically cross-linked closed cell foam is preferable as the foamed sheet. As an example, the thickness of the thermoplastic sheet is 1 to 4 mm, and its expansion ratio is 5 to 30 times. In another example, the thickness of the thermoplastic sheet may be 1 mm or less or 4 mm or more. In addition, the expansion ratio may be 5 times or less or 30 times or more.

First Embodiment

Figure 1:
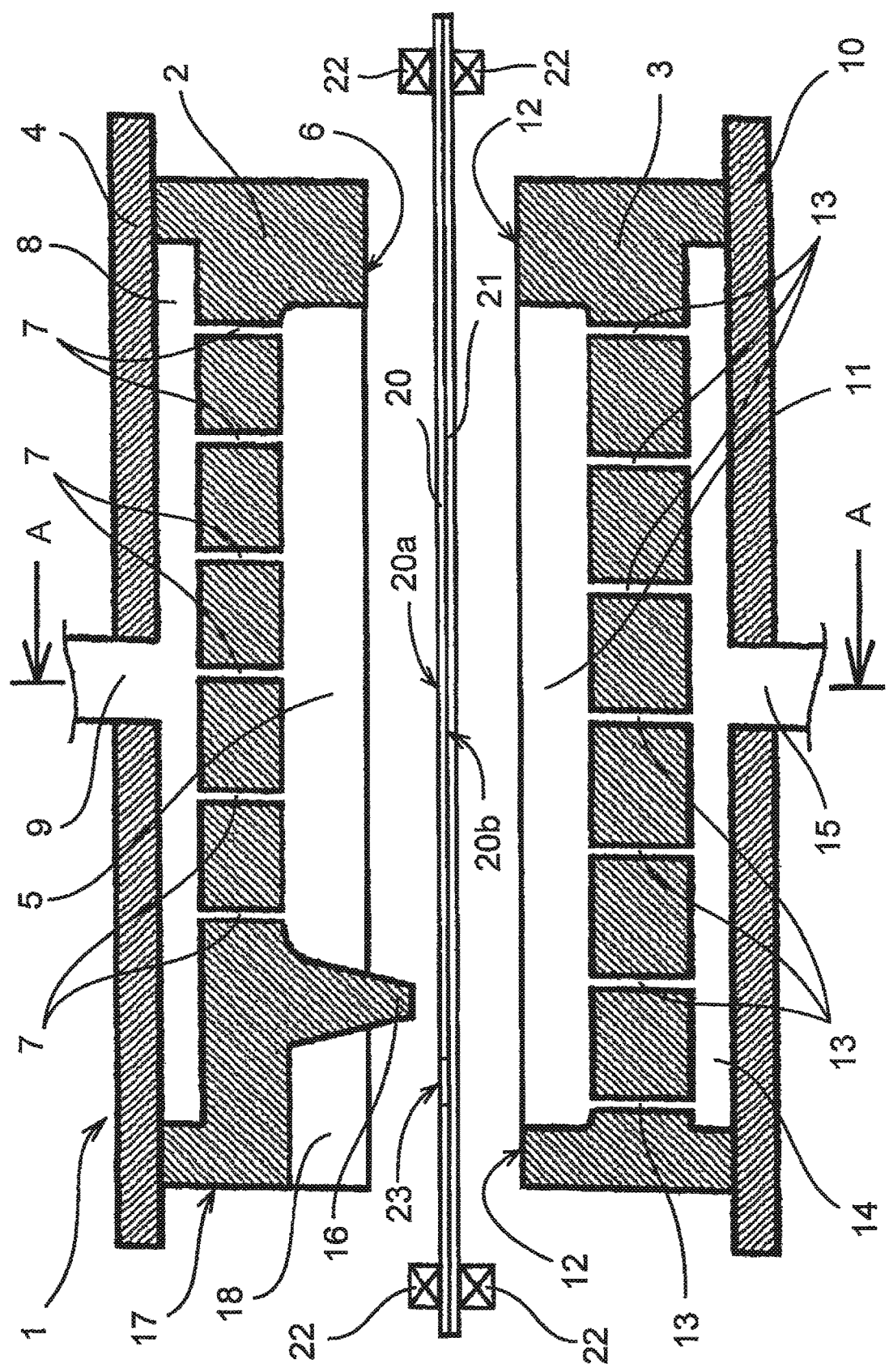
FIG. 1 is a longitudinal sectional view of a vacuum molding machine used in a method for manufacturing a hollow molded article of an aspect of the present invention (First Embodiment).
Figure 2:
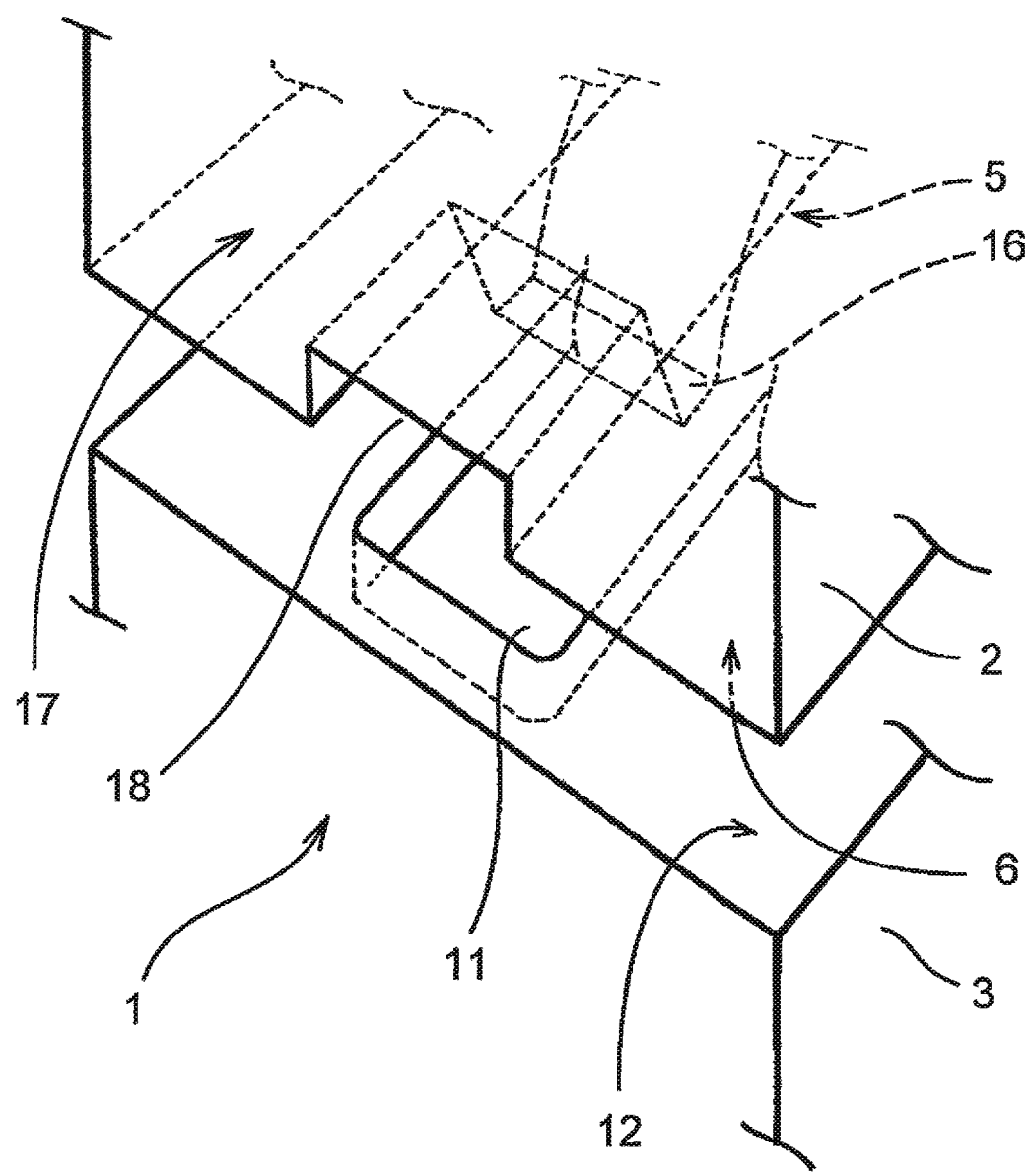
FIG. 2 is a perspective view of a left side surface of the vacuum molding machine of FIG. 1 (First Embodiment).

FIGS. 1 and 2 illustrate a vacuum molding machine (an apparatus for molding a hollow molded article, an apparatus for manufacturing a hollow molded product) 1 for performing a method for manufacturing a hollow molded article of an aspect of the present invention. The vacuum molding machine 1 has a first vacuum molding die (a first molding die) 2 and a second vacuum molding die (a second molding die) 3. The first vacuum molding die 2 is attached to a frame body 4 and is formed with a concave molding surface 5 (a molding surface that forms a concave section). The molding surface 5 is open to a lower end surface (an end surface, a pressing surface) 6 of the first vacuum molding die 2 and a plurality of intake holes (air bleeding holes) 7 are open to the bottom section of the molding surface 5. The intake holes 7 are connected to an intake chamber 8 formed between the first vacuum molding die 2 and the frame body 4, and the intake chamber 8 is connected to an intake pump (not shown) via an intake passage 9. Similarly, the second vacuum molding die 3 is attached to a frame body 10, and is formed with a concave molding surface (a molding surface that forms a concave section, concave section, molding section) 11. The molding surface 11 is open to an upper end surface 12 (an end surface, a pressing surface) of the second vacuum molding die 3, and a plurality of intake holes (air bleeding holes) 13 are open to the bottom section of the molding surface 11. The intake holes 13 are connected to an intake chamber 14 formed between the second vacuum molding die 3 and the frame body 10, and the intake chamber 14 is connected to an intake pump (not shown) via an intake passage 15. Further, the first vacuum molding die 2 and the second vacuum molding die 3 are disposed so that the lower end surface 6 and the upper end surface 12 face each other. The first vacuum molding die 2 and the second vacuum molding die 3 are driven by a hydraulic device (not shown), and can approach and space apart from each other.

The first vacuum molding die 2 is formed with a convex section 16 at a position adjacent to the molding surface 5, and the convex section 16 projects toward the molding surface 11 of the second vacuum molding die 3. The convex section 16 projects from the end surface 6 of the first vacuum molding die 2 by a predetermined length. On an opposite side of the convex section 16 (with the convex section 16 holding there between) of the molding surface 5, a notch 18 which opens to the lower end surface 6 and the front end surface 17 of the first vacuum molding die 2 is formed. The notch 18 defines a section which does not hold a front surface 20a of a first thermoplastic resin sheet (a first resin sheet) 20 and a rear surface 20b of the first thermoplastic resin sheet 20 on the lower end surface 6 around the molding surface 5, when the first vacuum molding die 2 and the second vacuum molding die 3 are closed (clamped).

Between the first vacuum molding die 2 and the second vacuum molding die 3, the first thermoplastic resin sheet 20 to be vacuum molded by the first vacuum molding die 2 and a second thermoplastic resin sheet (a second resin sheet) 21 to be vacuum molded by the second vacuum molding die 3 are disposed so as to superimpose with each other. The thermoplastic resin sheet 20 and the thermoplastic resin sheet 21 are fixed by a plurality of clamps 22 to suppress sagging (drawdown) of the sheet when heating the sheet. Further, a fluid passage (through-hole) 23 is previously formed in the first thermoplastic resin sheet 20 so as to be located outside the molding surface 5 of the first vacuum molding die 2. The fluid passage (through-hole) 23 has openings on the front surface 20a and the rear surface 20b of the first thermoplastic resin sheet 20. As shown in FIG. 1, the fluid passage (through-hole) 23 is disposed at a position corresponding to the notch 18 of the first vacuum molding die 2. The openings of the fluid passage (through-hole) 23 are connected to fluid supply source (for example outer space) which enables to intake air from outside of the first and second vacuum molding die. The opening of the front surface 20a of the first thermoplastic resin sheet 20 faces the notch 18, and the opening of the rear surface 20b of the first thermoplastic resin sheet 20 faces the second thermoplastic resin sheet 21.

Figure 3:
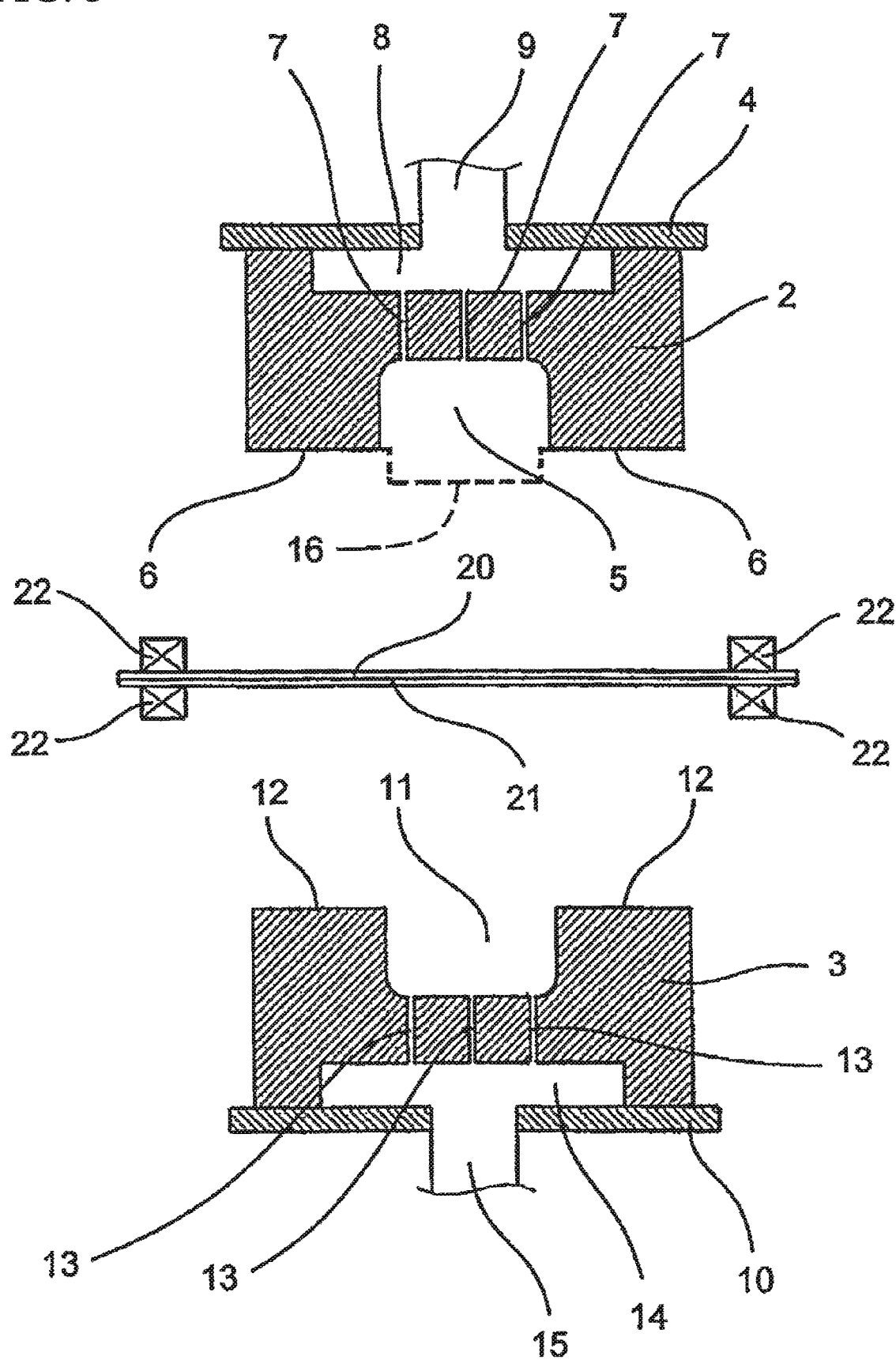
FIG. 3 is a cross-sectional view of a vacuum molding machine taken along the line A-A of FIG. 1. This figure shows a state in which first and second thermoplastic resin sheets are clamped between first and second vacuum molding dies of the vacuum molding machine of FIG. 1 (First Embodiment).
Figure 4:
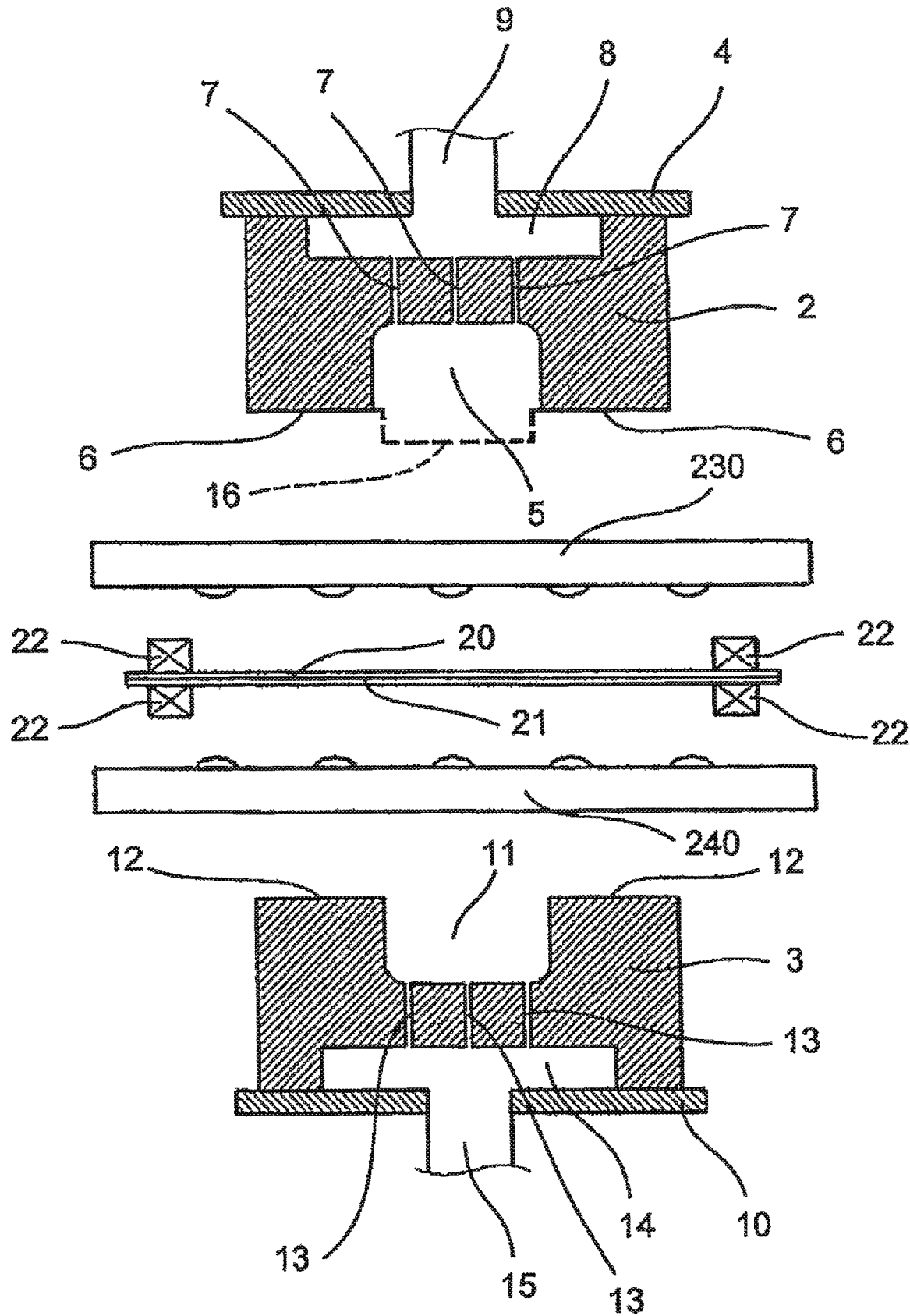
FIG. 4 is a cross-sectional view showing a state in which a thermoplastic sheet heating device is disposed between the first and second vacuum molding dies of the vacuum molding machine of FIG. 3 (First Embodiment).
Figure 5:
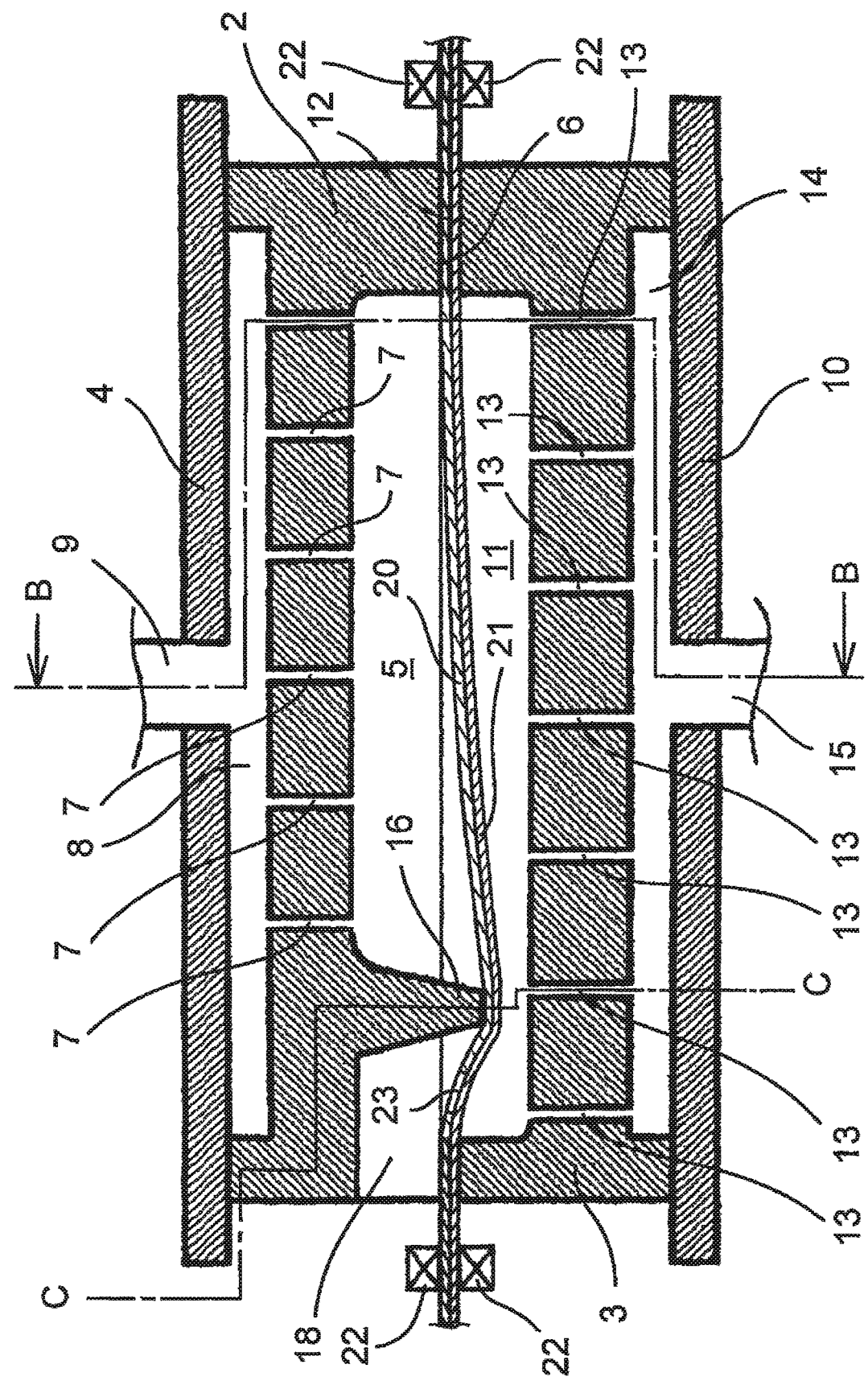
FIG. 5 is a longitudinal sectional view showing a state in which the first and second vacuum molding dies of the vacuum molding machine of FIG. 1 are clamped (First Embodiment).
Figure 6:
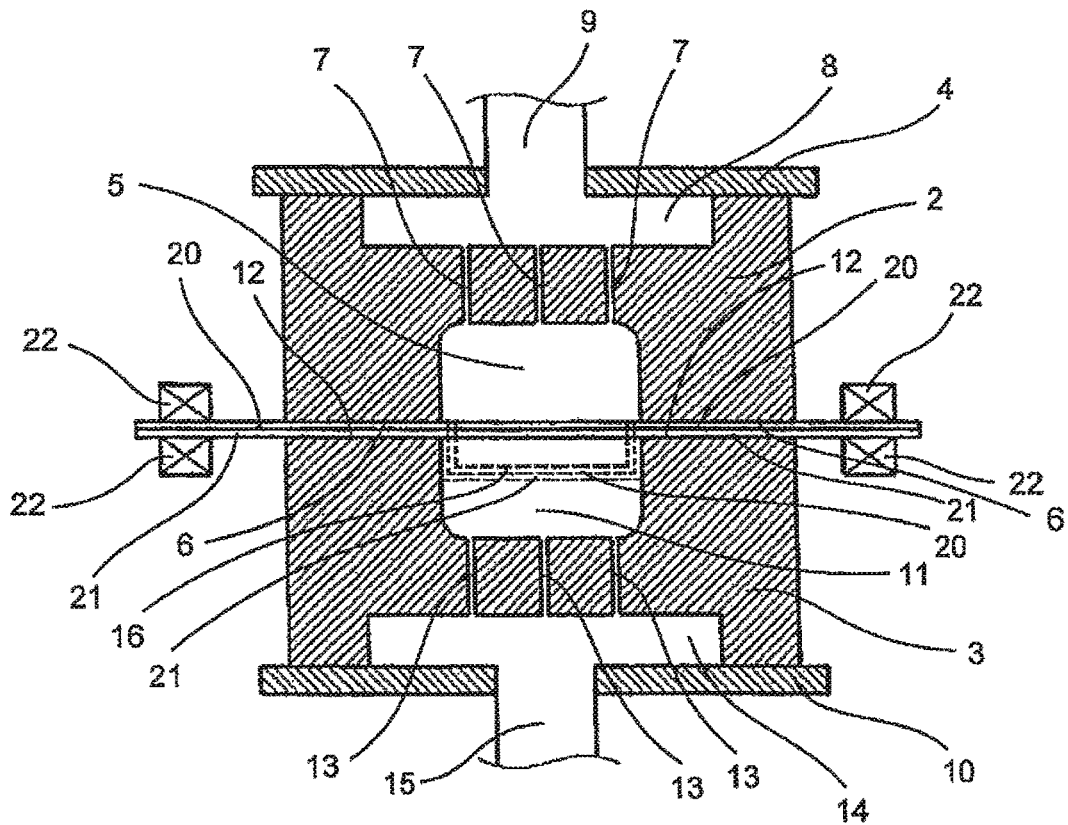
FIG. 6 is a cross-sectional view of the vacuum molding machine taken along the line B-B of FIG. 5 (First Embodiment).
Figure 7:
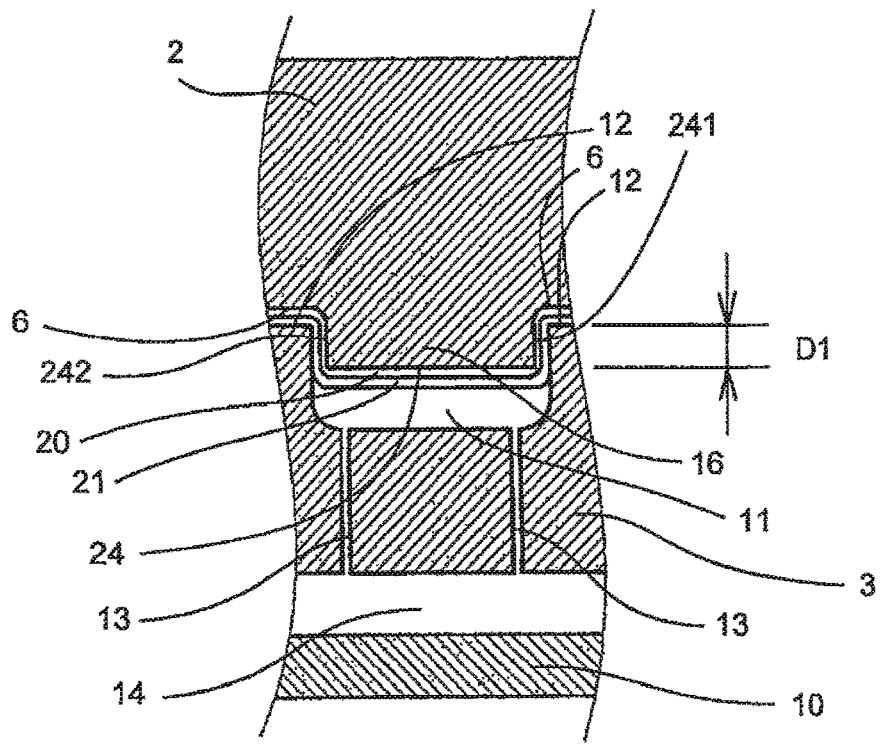
FIG. 7 is a cross-sectional view of the vacuum molding machine taken along the line C-C of FIG. 5 (First Embodiment).

When performing the vacuum molding of the first thermoplastic resin sheet 20 and the second thermoplastic resin sheet 21 using the vacuum molding machine 1, the first vacuum molding die 2 and the second vacuum molding die 3 are spaced apart from each other from the state shown in FIG. 1 to the state shown in FIG. 3. Further, as shown in FIG. 4, a heating device 230 is inserted into the top of the first thermoplastic resin sheet 20, a heating device 240 is inserted into the bottom of the second thermoplastic resin sheet 21, and the first thermoplastic resin sheet 20 and the second thermoplastic resin sheet 21 are softened by being heated. Next, the first vacuum molding die 2 and the second vacuum molding die 3 are clamped (closed). Further, as shown in FIGS. 5 to 7, in the state where the first thermoplastic resin sheet 20 and the second thermoplastic resin sheet 21 are superimposed, both sheets 20 and 21 are held by the lower end surface 6 of the first vacuum molding die 2 and the upper end surface 12 of the second vacuum molding die 3, and the first thermoplastic resin sheet 20 and the second thermoplastic resin sheet 21 are joined around the molding surface 5 of the first vacuum molding die 2 and around the molding surface 11 of the second vacuum molding die 3. At the same time, the molding surface 5 of the first vacuum molding die 2 is sealed by the first thermoplastic resin sheet 20, and the molding surface 11 of the second vacuum molding die 3 is sealed by the second thermoplastic resin sheet 21. Further, the opening of the first vacuum molding die 2 side among the openings of the fluid passage (through-hole) 23 of the first thermoplastic resin sheet 20 is disposed on the notch 18. In these drawings, although the fluid passage (through-hole) 23 is shown as a substantially rectangular shape, the shape of the fluid passage (through-hole) 23 is not limited thereto and may be a cut such as a cross slit.

Figure 8:
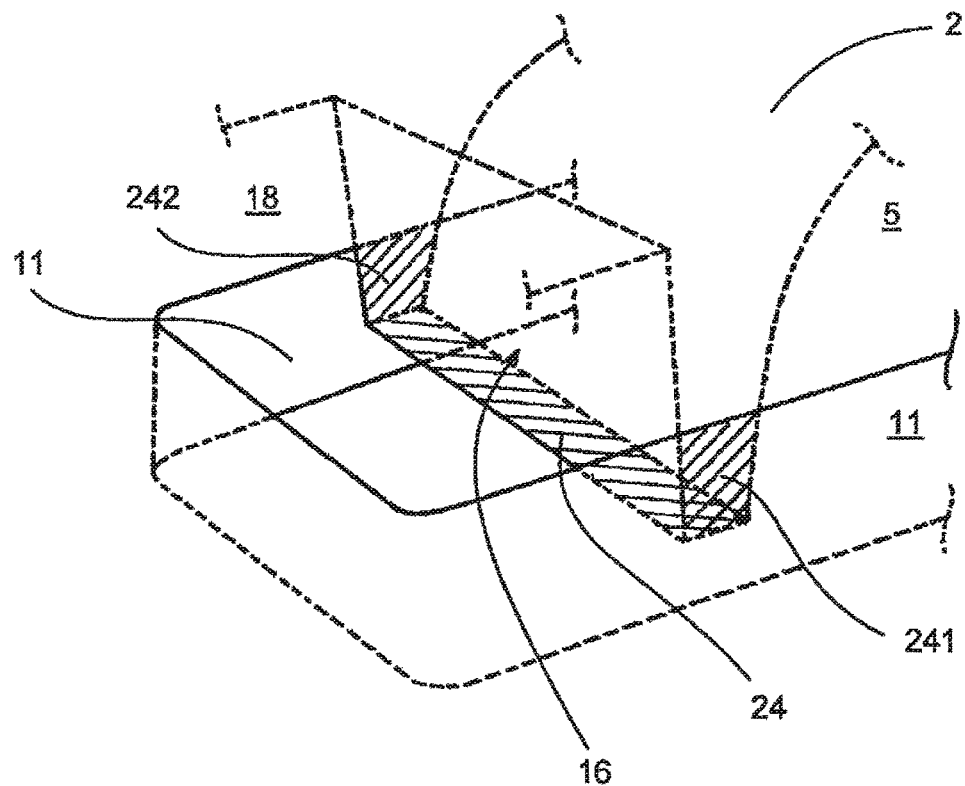
FIG. 8 is a perspective view showing a state in which a convex section of the first vacuum molding die enters a concave section (a molding surface) of a second vacuum molding die (First Embodiment).
Figure 9:
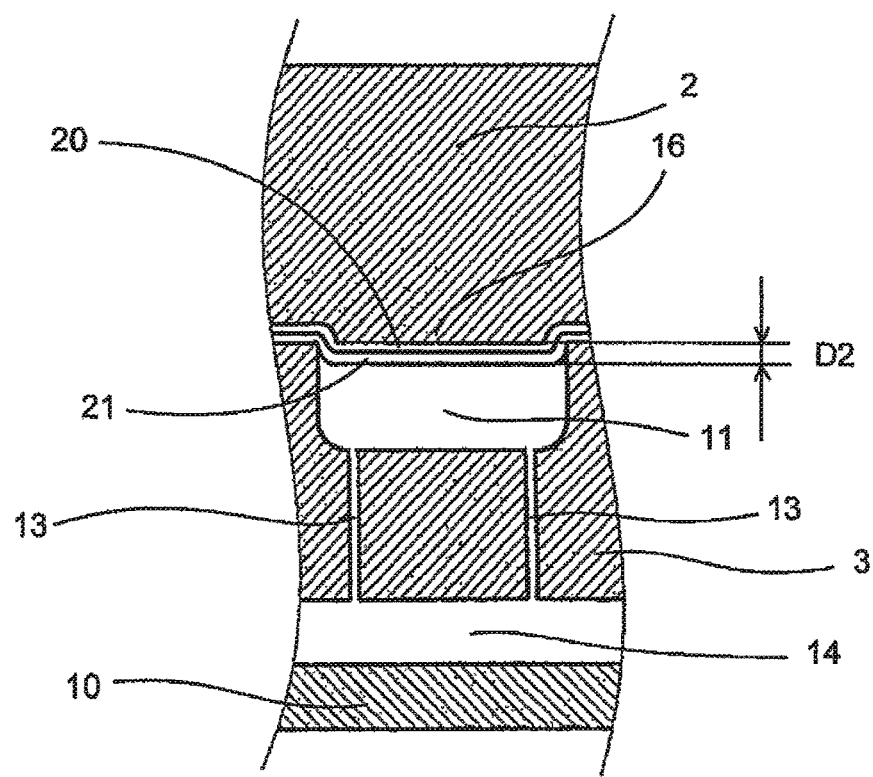
FIG. 9 is a cross-sectional view showing a modified aspect of FIG. 7 (First Embodiment).

Further, when clamping the first vacuum molding die 2 and the second vacuum molding die 3, as shown in FIGS. 5 to 7, a convex section 16 of the first vacuum molding die 2 presses a region of the first thermoplastic resin sheet 20 extending between the molding surface 5 of the first vacuum molding die 2 and the fluid passage (through-hole) 23, together with the second thermoplastic resin sheet 21, into the molded section 11 (concave section) of the second vacuum molding die 3. Further, between the first vacuum molding die 2 and the first thermoplastic resin sheet 20, as shown by diagonal lines in FIG. 8, seal sections 24, 241 and 242 extending along the convex section 16 of the first vacuum molding die 2 are formed. In this embodiment, the concave section of the second vacuum molding die 3 in which the convex section 16 of the first vacuum molding die 2 enters is configured by a part of the molding surface 11 of the second vacuum molding die 2. Further, as shown in FIG. 7, the convex section 16 of the first vacuum molding die 2 enters the inside of the molding surface 11 of the second vacuum molding die 3 by a depth D1. Therefore, seal sections 241 and 242 of sufficient length can also be formed on both side surfaces of the convex section 16, as well as the seal section 24 of the lower end surface of the convex section 16. In contrast, as shown in FIG. 9, the depth at which the convex section 16 of the first vacuum molding die 2 enters the inside of the molding surface 11 of the second vacuum molding die 3 can be reduced to a depth D2. The depth D2 is at least equivalent to a height enough to push the first thermoplastic resin sheet 20 and the second thermoplastic resin sheet 21 to the inside of the molding surface 11.

In this way, the height of the convex section 16 of the first vacuum molding die 2 is preferably set to have a height enough to at least push the first thermoplastic resin sheet 20 and the second thermoplastic resin sheet 21 into the molded section 11 (the concave section) of the second vacuum molding die 3 when clamping the dies. The reason is that the first thermoplastic resin sheet 20 bent along the convex section 16 can be held to the convex portion 16, by the second thermoplastic resin sheet 21 bent along the convex section 16. Further, the width of the convex section 16 is preferably set so that a clearance in a widthwise direction between the convex section 16 and the molded section 11 (the concave section) is equal to or less than the thickness (total thickness of the first and second thermoplastic resin sheets 20 and 21) of the superimposed first and second thermoplastic resin sheets 20 and 21, when entering the molded section (the concave section) 11 of the second vacuum molding die 3. This setting is in order to obtain good sealing performance. Furthermore, the clearance between the convex section 16 and the bottom section of the molded section 11 (the concave section) when the convex section 16 enters into the molded section 11 (the concave section) of the second vacuum molding die 3 may be a distance equal to or more than the thickness of the superimposed first and second thermoplastic resin sheets 20 and 21 (the total thickness of the first and second thermoplastic resin sheets 20 and 21). This is in order to form a clearance for the passage of fluid between the first thermoplastic resin sheet 20 and the second thermoplastic resin sheet 21, when the second thermoplastic resin sheet 21 is vacuum-molded. Also, when increasing the height of the convex section 16 of the first vacuum molding die 2 to increase the depth at which the first thermoplastic resin sheet 20 and the second thermoplastic resin sheet 21 are pushed into the molded section 11 (the concave section) of the second vacuum molding die 3, a force of holding the first thermoplastic resin sheet 20 bent along the convex section 16 to the convex section 16 by the second thermoplastic resin sheet 21 bent along the convex section 16 increases. Furthermore, it is also possible to increase the area of the overlapping section between both side surfaces of the convex section 16 and the molded section 11 (the concave section). Therefore, it is also possible to increase the area of the first and second thermoplastic resin sheets 20 and 21 held between both side surfaces of the convex section 16 and the molded section 11 (the concave section). Thus, it is possible to further increase the sealing force of the above-described seal sections 24, 241 and 242.

Figure 10:
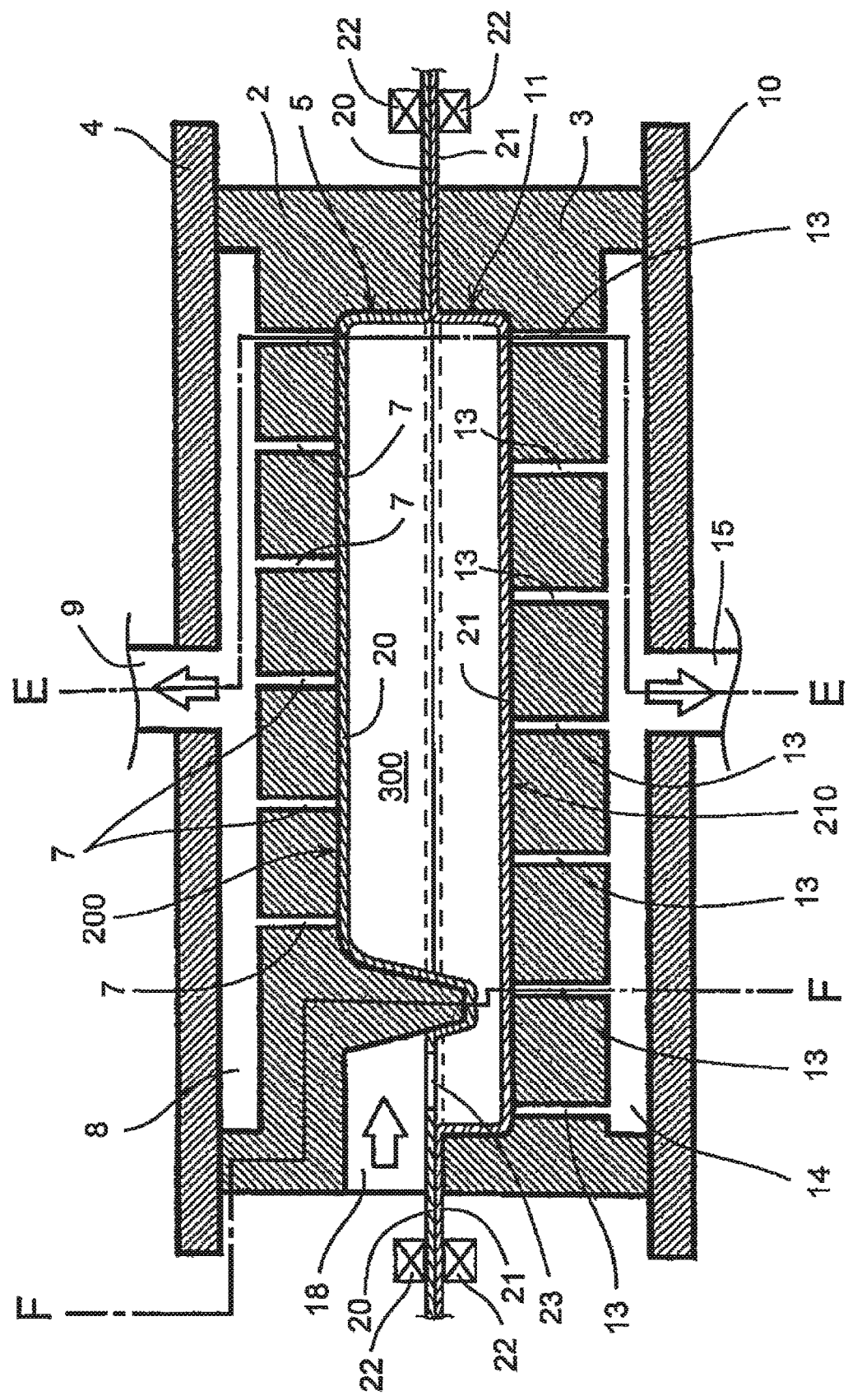
FIG. 10 is a longitudinal sectional view of the vacuum molding machine when air is evacuated from the molding surfaces of the first and second vacuum molding dies and the vacuum molding is performed on the first and second thermoplastic resin sheets (First Embodiment).
Figure 11:
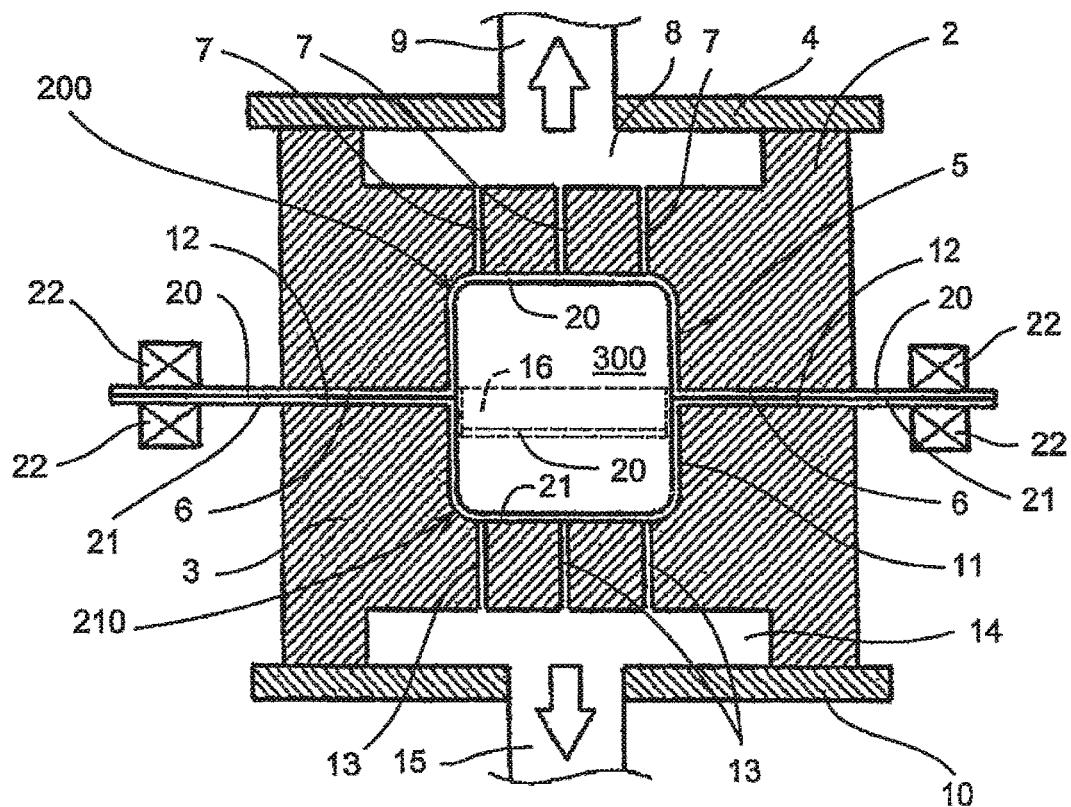
FIG. 11 is a cross-sectional view of a vacuum molding machine taken along the line E-E of FIG. 10 (First Embodiment).
Figure 12:
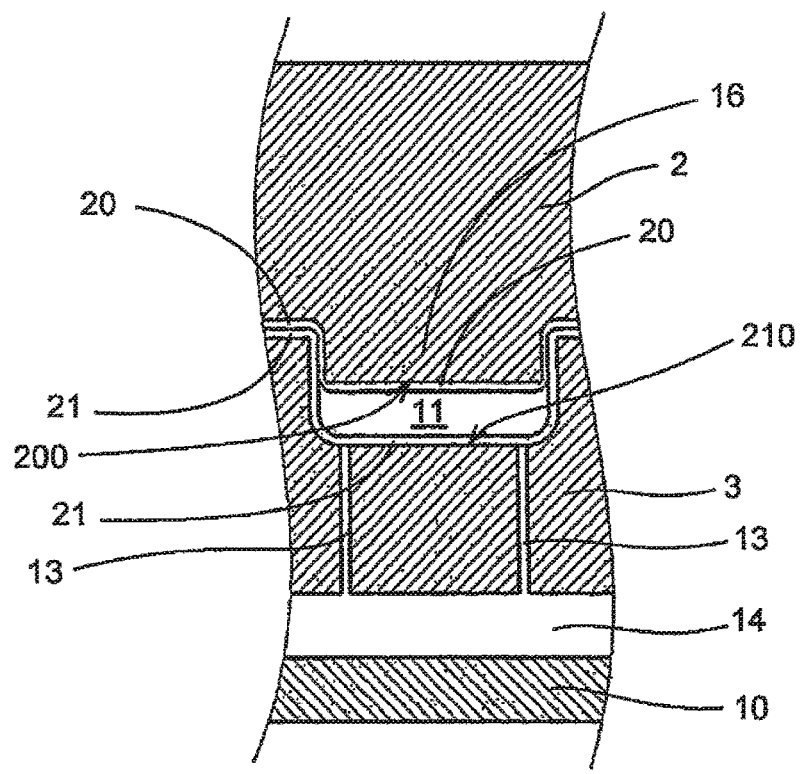
FIG. 12 is a cross-sectional view of a vacuum molding machine taken along the line F-F of FIG. 10 (First Embodiment).

When the clamping of the first vacuum molding die 2 and the second vacuum molding die 3 is completed, as shown in FIGS. 10 and 11, air (gas) is suctioned from the intake passages 9 and 15, and the air in the molding surface 5 and the molding surface 11 is evacuated. Thus, the first thermoplastic resin sheet 20 is vacuum-molded by the first vacuum molding die 2, and a first shaping section 200 is formed on the first thermoplastic resin sheet 20 by the molding surface 5 of the first vacuum molding die 2. Furthermore, the second thermoplastic resin sheet 21 is vacuum-molded by the second vacuum molding die 3, and a second shaping section 210 is formed on the second thermoplastic resin sheet 21 by the molded section 11 of the second vacuum molding die 3. Further, a hollow section 300 is defined between the first thermoplastic resin sheet 20 and the second thermoplastic resin sheet 21, by the first shaping section 200 and the second shaping section 210.

At this time, among the plurality of intake holes 7 opening on the bottom section of the molding surface 5 of the first vacuum molding die 2, the intake hole 7 disposed at a position closest to the convex section 16 is preferably disposed adjacent to the convex section 16 as close as possible. The reason is that good sealing performance is obtained in the seal section 24 formed between the first thermoplastic resin sheet 20 and the convex section 16, by suctioning the air from the intake hole 7 of the position adjacent to the convex section 16.

Figure 13:
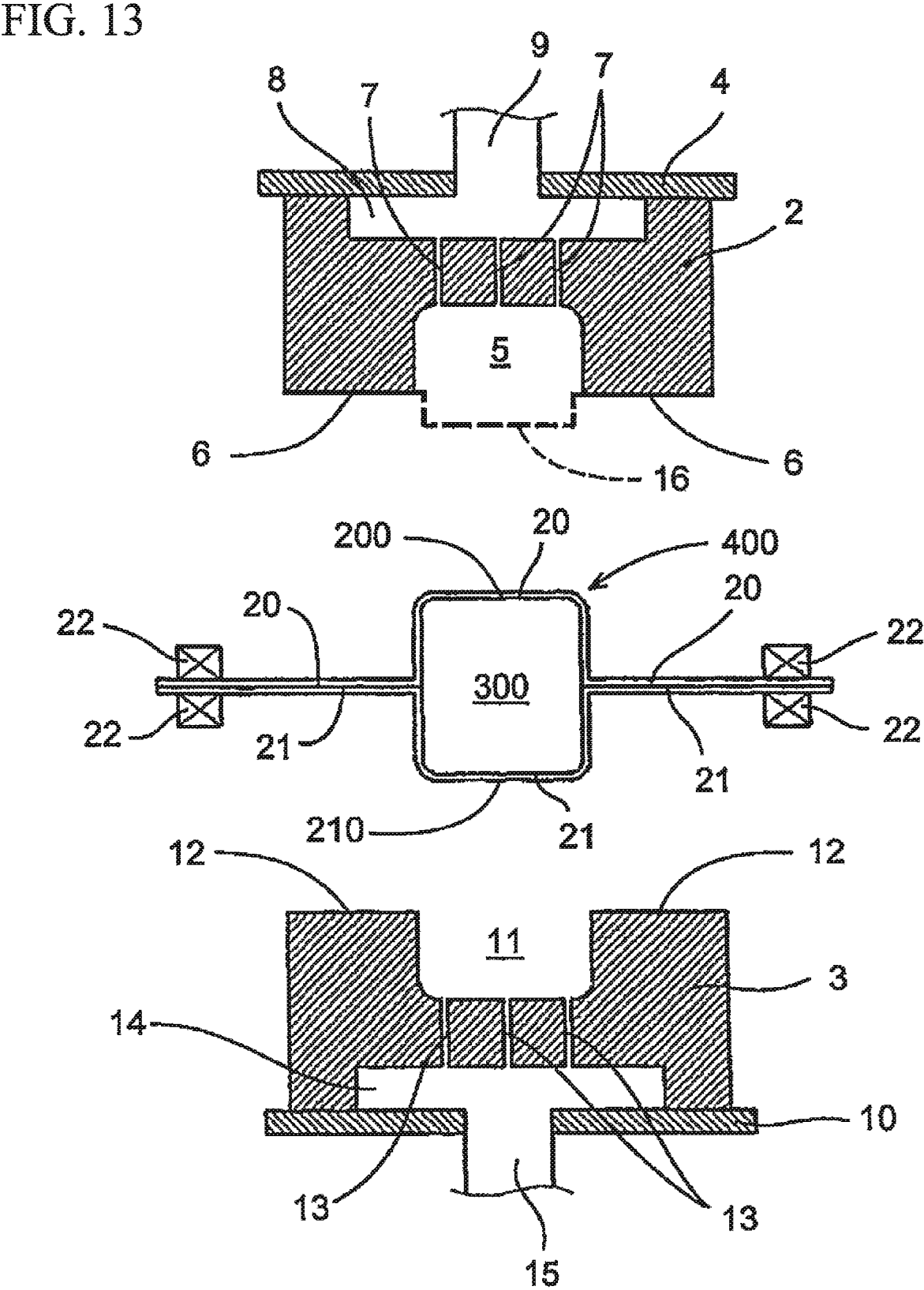
FIG. 13 is a cross-sectional view showing a state in which the first and second vacuum molding dies are opened from the state of FIG. 11 (First Embodiment).
Figure 14:
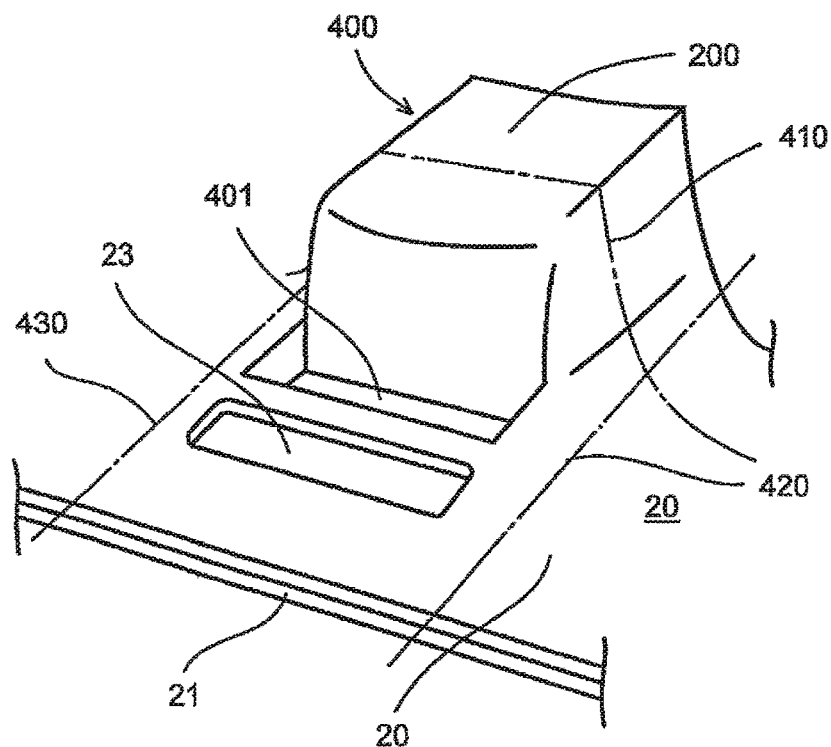
FIG. 14 is a perspective view of a front end section of the hollow molded article of FIG. 13 (First Embodiment).
Figure 15:
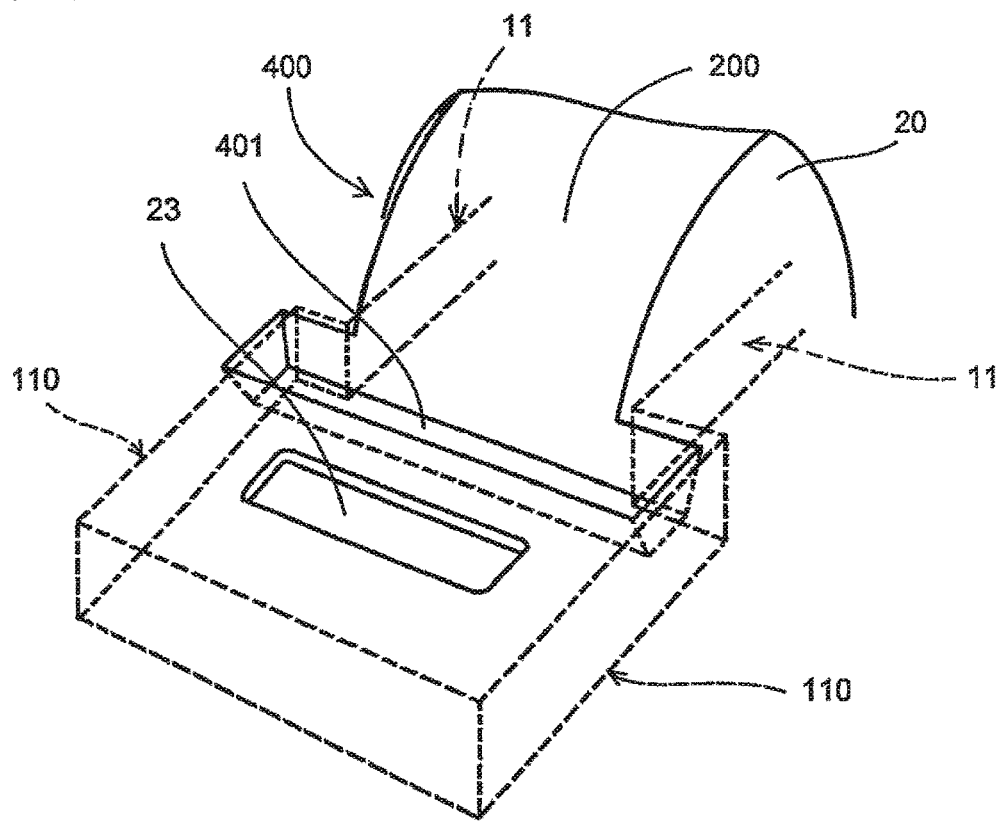
FIG. 15 is a perspective view of a concave section in a case where the width of the convex section of the first vacuum molding die is larger than the width of the molding surface of the second vacuum molding die (First Embodiment).
Figure 16:
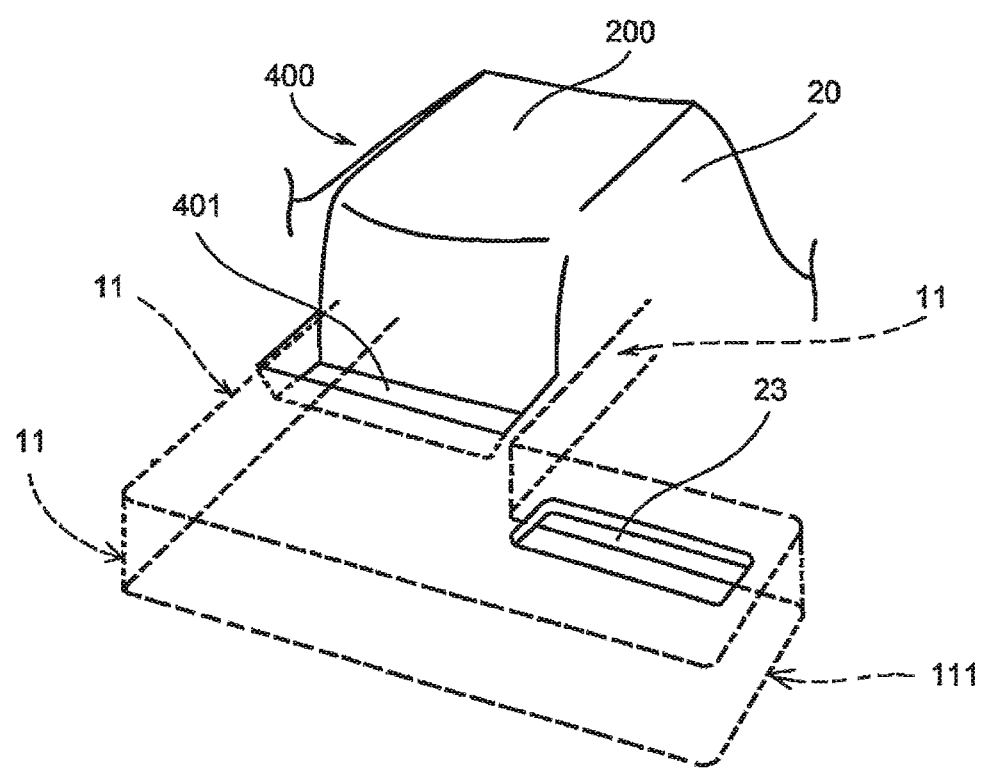
FIG. 16 is perspective view of an end section of the vacuum molding die in a case where a fluid passage of the first thermoplastic resin sheet is located at a position deviated from the molding surface of the first vacuum mold (First Embodiment).

Next, as shown in FIG. 13, the first vacuum molding die 2 and the second vacuum molding die 3 are opened to take out a semi-finished product 400 having the hollow section 300. FIG. 14 is a perspective view of a front end section of the semi-finished product that is taken out. At the front end section of the first shaping section 200 of the first thermoplastic resin sheet 20, a concave section 401 is formed at a location where the convex section 16 of the first vacuum molding die 2 enters. Further, FIG. 15 is a perspective view of the front end section of the semi-finished product 400 when molding the first thermoplastic resin sheet 20, by a convex section (not shown) having a lateral (widthwise) length larger than the width of the molding surface 11 of the second vacuum molding die 3. In order to allow the wide convex section to enter, a wide concave section 110 is formed at the front end section of the molding surface 11 of the second vacuum molding die 3. FIG. 16 shows a case where the fluid passage 23 of the first thermoplastic resin sheet 20 is formed at a location laterally deviated from the molding surface 5 of the first vacuum molding die 2, rather than being formed at a position matching with the molding surface 5 of the first vacuum molding die 2. In this case, the second thermoplastic resin sheet 21 is spaced apart from the first thermoplastic resin sheet 20, and the molding surface 11 of the second vacuum molding die 3 extends to the position of the fluid passage (through-hole) 23 of the first thermoplastic resin sheet 20 to form a molding surface 111. At this time, the fluid such as air is made to smoothly flow into between the first and second thermoplastic resin sheets 20 and 21 from the fluid passage (through-hole) 23 of the first thermoplastic resin sheet 20. Further, when obtaining a finished product of the hollow molded body from the semi-finished product 400, for example, the front end section and both side sections of the semi-finished product 400 are cut along the lines 410, 420 and 430 of the semi-finished products 400 shown in FIG. 14. In this way, it is possible to obtain a tubular body as a finished product.

Second Embodiment

Figure 17:
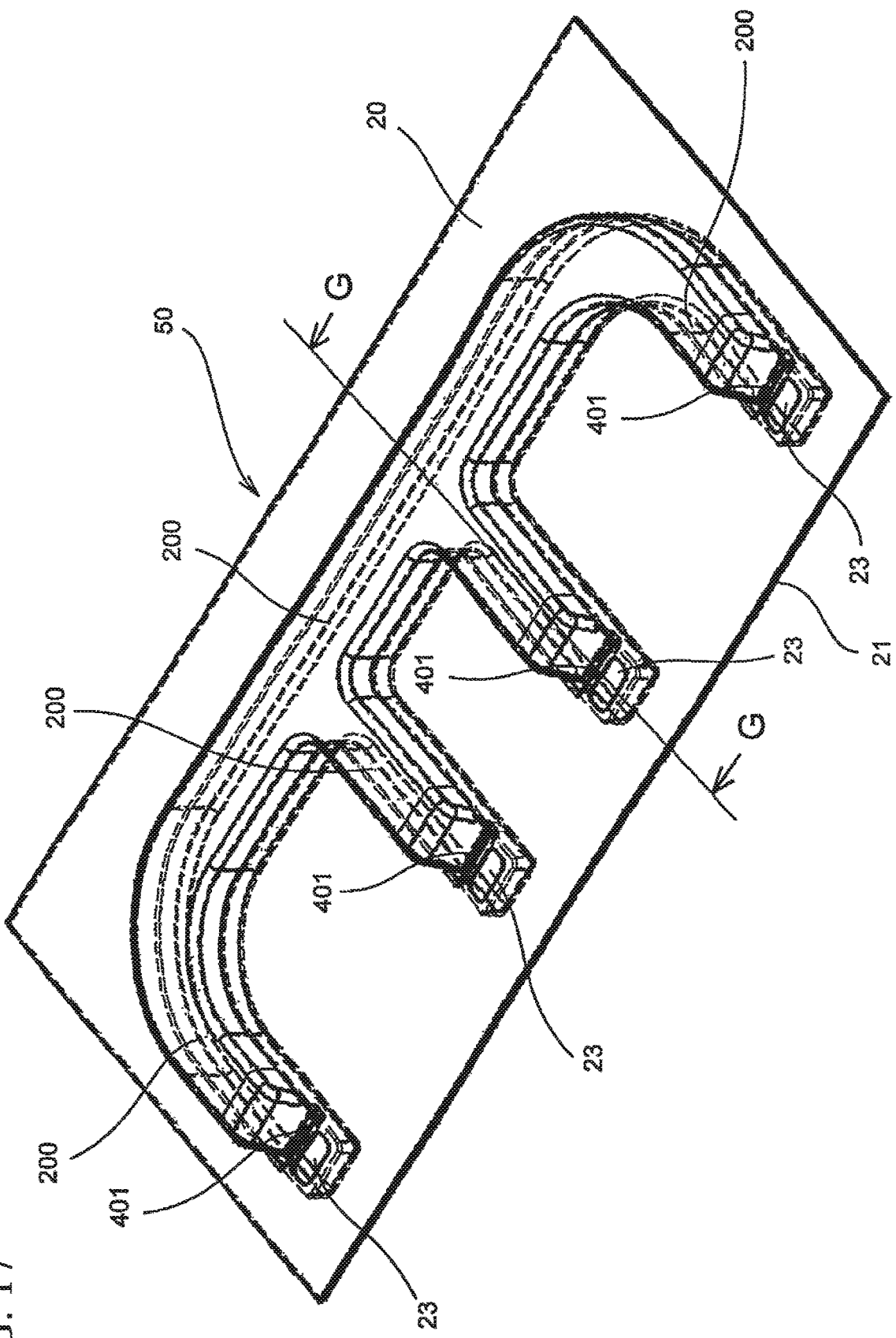
FIG. 17 is a perspective view of a semi-finished product of an air-conditioning duct of a motor vehicle manufactured by the method for manufacturing the hollow molded article of the present invention (Second Embodiment).
Figure 18:
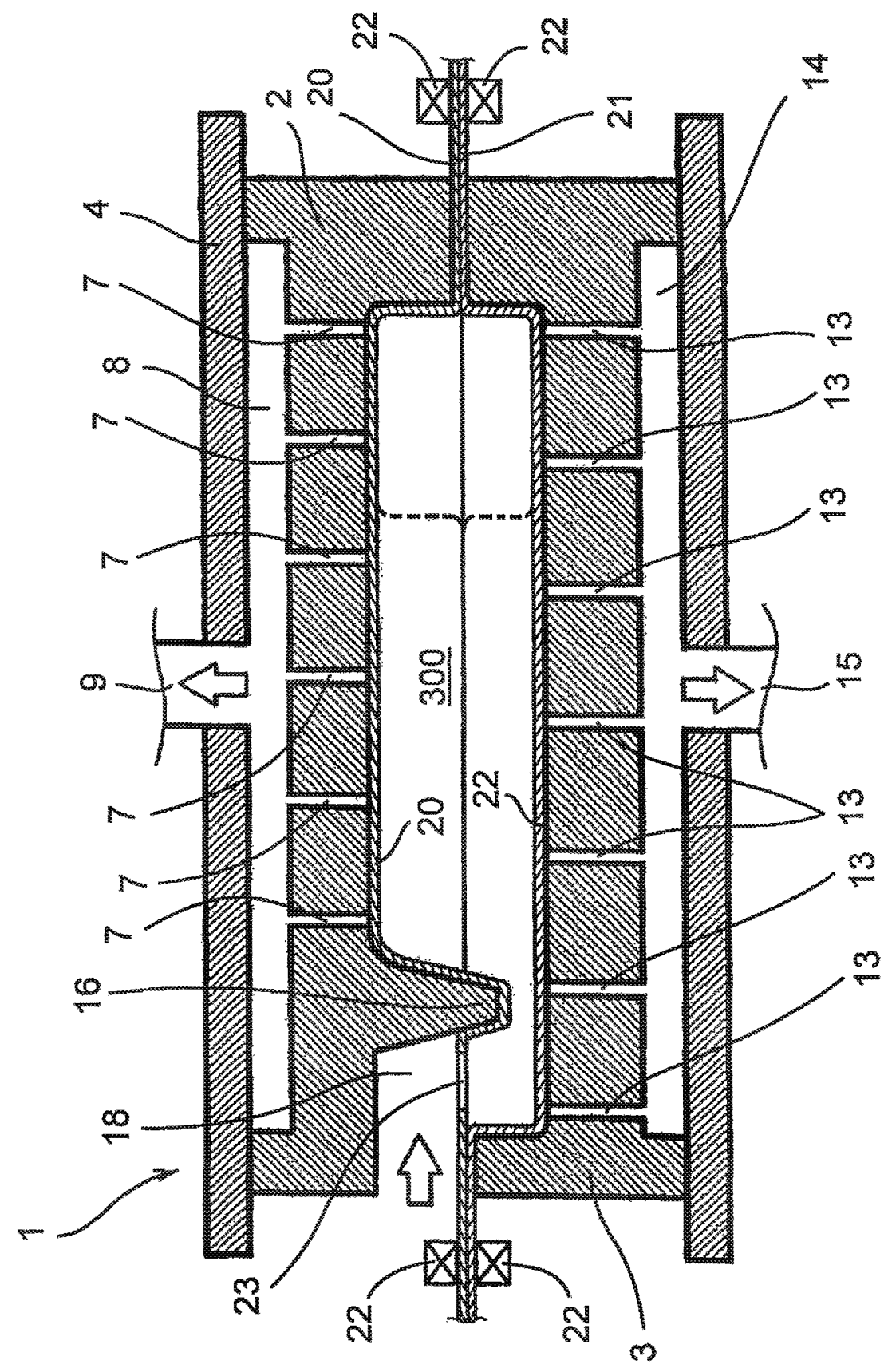
FIG. 18 is a longitudinal sectional view taken along the line G-G of FIG. 17 showing a state before the vacuum molding machine for manufacturing the air-conditioning duct of FIG. 17 is open (Second Embodiment).
Figure 19:
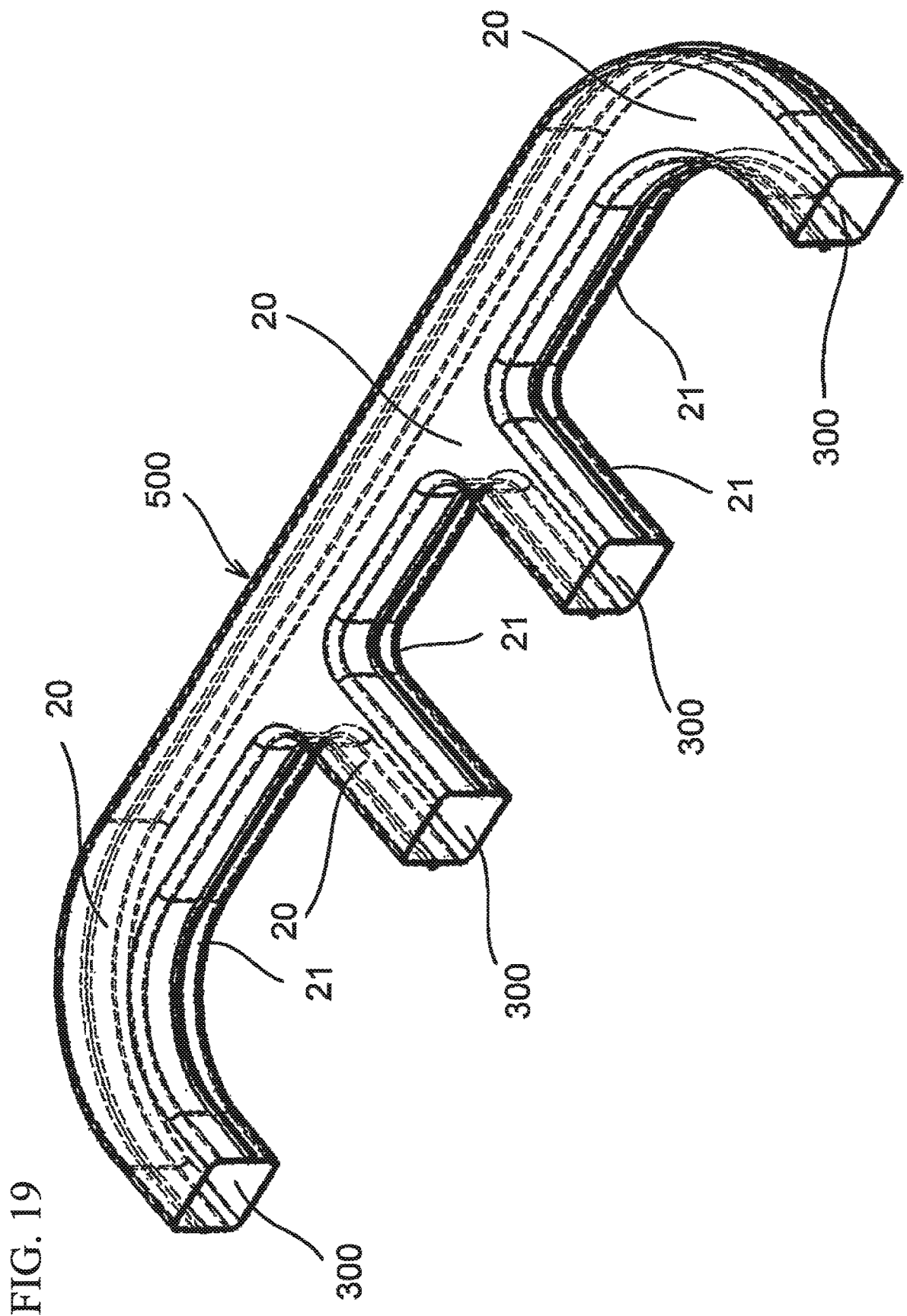
FIG. 19 is a perspective view of the air-conditioning duct completed by cutting the excess section from the semi-finished product of FIG. 18 (Second Embodiment).

FIG. 17 is a perspective view of a semi-finished product of the air-conditioning duct of the motor vehicle produced by the method for manufacturing the hollow molded article of the aspect of the present invention. The semi-finished product 50 is provided with a plurality of shaping sections in the first thermoplastic resin sheet 20 and the second thermoplastic resin sheet 21. A state before opening the vacuum molding machine 1 to manufacture a semi-finished product 50 of the air-conditioning duct shown in FIG. 17 is shown in FIG. 18. Reference numerals of FIGS. 17 and 18 common to the reference numbers of other drawings illustrate components of the same names. Further, FIG. 19 is a perspective view of an air-conditioning duct 500 completed by cutting the excess sections from the semi-finished product shown in FIG. 17.

As described above, in an embodiment, the manufacturing apparatus (vacuum molding machine) 1 of the hollow molded article includes a first molding die (a first vacuum molding die) 2, and a second molding die (a second vacuum molding die) 3 disposed to face the first molding die 2. Each of the first molding die 2 and the second molding die 3 includes pressing surfaces (a lower end surface and an upper end surface) 6 and 12 for partially holding two resin sheets (the first thermoplastic resin sheet and the second thermoplastic resin sheet) 20 and 21 between the first molding die 2 and the second molding die 3, molding surface 5 and 11 that form a concave section with respect to the pressing surfaces 6 and 12, and a plurality of suction holes (intake holes) 7 and 13 provided on the molding surfaces 5 and 11. The first molding die 2 further has a convex section 16 that partially projects in comparison with the pressing surface 6 of the first molding die 2.

In an example, the convex section 16 has a shape provided such that gas (air) is naturally suctioned into a space formed between the two resin sheets 20 and 21 via the through-hole (the fluid passage) 23 provided on the resin sheet 20, when performing the vacuum molding of at least one of the two resin sheets 20 and 21.

When the first molding die 2 and the second molding die 3 face each other, a part of the convex section 16 is disposed in the concave section of the second molding die 3. In an example, the clearance between the side surface of the convex section 16 and the wall of the second molding die 3 may be substantially the same as or smaller than the total thickness of the first resin sheet 20 and the second resin sheet 21.

The convex section 16 has a projecting height with respect to the pressing surface 6 greater than the total thickness of the two resin sheets 20 and 21 of the non-compressed state. In an example, the projecting height can be smaller than the value obtained by subtracting the total thickness of the two resin sheets 20 and 21 of the non-compressed state from the depth of the concave section of the second molding die 3 at the position where the convex section 16 is disposed.

In an embodiment, the manufacturing method of the hollow molded article has a process of superimposing the first resin sheet 20 having the through-hole (fluid passage) 23 and the second resin sheet 21, a process of disposing the first resin sheet 20 and the second resin sheet 21 between the first molding die 2 and the second molding die 3 to partially join the first resin sheet 20 and the second resin sheet 21, and a process of performing vacuum molding of each of the first resin sheet 20 and the second resin sheet 21 by the first molding die 2 and the second molding die 3. The molding process of the first resin sheet 20 and the second resin sheet 21 includes a process of supplying the gas (air) into the space formed between the first resin sheet 20 and the second resin sheet 21 via the through-hole 23 (fluid passage) of the first resin sheet 20.

The process of partially joining the first resin sheet 20 and the second resin sheet 21 includes a process of partially pushing the first resin sheet 20 and the second resin sheet 21 to the concave section of the second molding die 3.

When performing the vacuum molding of at least one of the first resin sheet 20 and the second resin sheet 21, gas is naturally suctioned into the space formed between the first resin sheet 20 and the second resin sheet 21 via the through-hole (fluid passage) 23. In an example, the process of partially joining the first resin sheet 20 and the second resin sheet 21 includes a process of partially pushing the first resin sheet 20 and the second resin sheet 21 to the concave section of the second molding die 3 by the convex section 16.

When performing the vacuum molding of at least one of the first resin sheet 20 and the second resin sheet 21, the first resin sheet 20 and the second resin sheet 21 are adjacent to or come into close contact with each other between the side surface of the convex section 16 and the wall of the second molding die 3, and a clearance through which the gas passes is provided between the first resin sheet 20 and the second resin sheet 21 near the top of the convex section 16, and the gas (air) is naturally suctioned into the space formed between the first resin sheet 20 and the second resin sheet 21 via the through-hole 23 (fluid passage) through the clearance.

In an example, a time difference is provided between the starting time of the vacuum molding of the first resin sheet 20 and the starting time of the vacuum molding of the second resin sheet 21.

According to the method for manufacturing the hollow molded article of the embodiment of the present invention, it is possible to manufacture a resin hollow article suitable for various intended uses, using a general-purpose vacuum molding machine, without using special facilities or devices.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The invention claimed is:

1. An apparatus for molding a hollow molded article, of which a hollow section is molded between a pair of superimposed, heated and softened thermoplastic resin sheets, by a pair of vacuum molding dies having shaping sections to form concave shapes which face each other on the pair of the thermoplastic resin sheets, wherein air bleeding holes are provided in the shaping sections; wherein one of the pair of the thermoplastic resin sheets is formed with a through-hole to which the hollow section is connected, one of the pair of the vacuum molding dies corresponding to the one of thermoplastic resin sheet is formed with a notch corresponding to the through-hole, when holding the pair of thermoplastic resin sheets by closing the pair of vacuum molding dies in a state in which the one thermoplastic resin sheet and the other thermoplastic resin sheet are superimposed with each other and are disposed between the pair of the vacuum molding dies; and a seal section configured to seal between one of the shaping sections and the notch, formed between the one shaping sections of the one vacuum molding die and the notch; wherein the seal section is formed along a convex section formed on the one vacuum molding die and a concave section, corresponding to the convex section, formed in the other vacuum molding die; and wherein the pair of thermoplastic resin sheets are held between the concave section and the convex section; the convex section has a top surface, a first side surface, and a second side surface; the first side surface and the second side surface are arranged separated from each other in a first direction and both extend in at least a second direction that intersects with the first direction; the top surface is arranged extending in the first direction between the first side surface and the second side surface; and the seal section has (i) a first portion extending along the top surface of the convex section, (ii) a second portion extending along the first side surface of the convex section, and (iii) a third portion extending along the second side surface of the convex section.

2. The apparatus of claim 1, wherein the convex section forms a substantially trapezoidal shape; a space is provided between the top surface of the convex section and the concave section; and the seal section is formed, by holding the pair of the thermoplastic resin sheets between the concave section and the side surfaces of the first and second side surfaces of the convex section facing the concave section.

3. An apparatus for molding a hollow molded article, the apparatus comprising: a first molding die and a second molding die disposed to face the first molding die; a pressing surface for partially holding a pair of thermoplastic resin sheets between the first molding die and the second molding die; a molding surface for forming a concave section with respect to the pressing surface and a plurality of suction holes provided on the molding surface; the first molding die includes a convex section provided to partially project in comparison with the pressing surface of the first molding die and further includes a fluid supply source adjacent to the convex section; wherein the pair of the thermoplastic resin sheets are held by closing the first and second molding dies in a state in which the pair of the thermoplastic resin sheets are superimposed with each other and are disposed between the first and second molding dies; wherein a seal section is formed along the convex section and a concave section, which corresponds to the convex section, of the second molding die; and wherein the pair of the thermoplastic resin sheets are held between the concave section and the convex section; the convex section has a top surface, a first side surface, and a second side surface; the first side surface and the second side surface are arranged separated from each other in a first direction and both extend in at least a second direction that intersects with the first direction; the top surface is arranged extending in the first direction between the first side surface and the second side surface; and the seal section has (i) a first portion extending along the top surface of the convex section, (ii) a second portion extending along the first side surface of the convex section, and (iii) a third portion extending along the second side surface of the convex section.

4. The apparatus of claim 3, wherein the fluid supply source is configured to be connected to a through-hole provided on one of the pair of the thermoplastic resin sheets corresponding to the first molding die.

5. The apparatus of claim 3, wherein the fluid supply source is configured to form a notch recessed partially in the first molding die.

6. The apparatus of claim 3, wherein the convex section forms a substantially trapezoidal shape; a space is provided between the top surface of the convex section and the concave section; and the seal section is formed by holding the pair of the thermoplastic resin sheets between the concave section and the side surfaces of the first and second side surfaces of the convex section facing the concave section.

7. An apparatus for molding a hollow molded article, the apparatus comprising: a first molding die and a second molding die disposed to face the first molding die; wherein each the first molding die and the second molding die has a pressing surface for partially holding two resin sheets between the first molding die and the second molding die; a molding surface for forming a concave section with respect to the pressing surface and a plurality of suction holes provided on the molding surface; the first molding die further includes a convex section provided to partially project in comparison with the pressing surface of the first molding die; wherein a seal section is formed along the convex section and a concave section, which corresponds to the convex section, of the second molding die; and wherein the two resin sheets are held between the concave section and the convex section; the convex section has a top surface, a first side surface, and a second side surface, the first side surface and the second side surface are arranged separated from each other in a first direction and both extend in at least a second direction that intersects with the first direction; the top surface is arranged extending in the first direction between the first side surface and the second side surface; and the seal section has (i) a first portion extending along the top surface of the convex section, (ii) a second portion extending along the first side surface of the convex section, and (iii) a third portion extending along the second side surface of the convex section.

8. The apparatus of claim 7, wherein a notch corresponding to a through-hole is provided on one of the two resin sheets corresponding to the first molding die.

\* \* \* \* \*